May 4, 1965 F. TAYLOR 3,181,481
COVER ASSEMBLY FOR OPEN TYPE VEHICLES
Filed Aug. 14, 1963 3 Sheets-Sheet 1
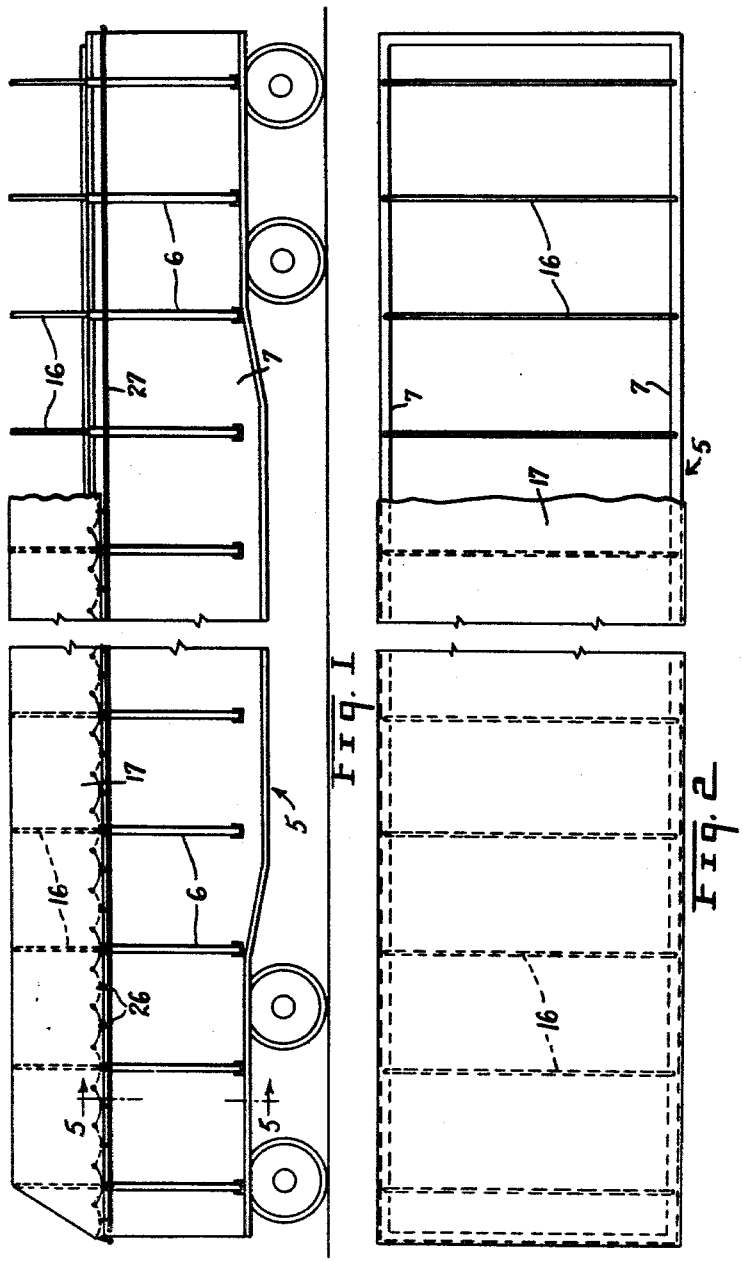
INVENTOR
F. TAYLOR
Featherstonhaugh & Co.
ATTORNEYS

INVENTOR
F. TAYLOR

Fetherstonhaugh & Co.
ATTORNEYS

May 4, 1965  F. TAYLOR  3,181,481
COVER ASSEMBLY FOR OPEN TYPE VEHICLES
Filed Aug. 14, 1963  3 Sheets-Sheet 3

INVENTOR
F. TAYLOR
Fetherstonhaugh & Co.
ATTORNEYS

United States Patent Office 3,181,481
Patented May 4, 1965

3,181,481
COVER ASSEMBLY FOR OPEN TYPE VEHICLES
Frank Taylor, 273 Eleanor Ave., Otterburn Heights,
Quebec, Canada
Filed Aug. 14, 1963, Ser. No. 302,120
Claims priority, application Canada, July 2, 1963,
879,214
7 Claims. (Cl. 105—377)

This invention relates to open top vehicles such as railway gondola cars, trucks and barges etc., and particularly to cover means which permit of the cover being retained in place on the vehicle for rapid opening and closing of the open top of the vehicle, and permitting unhindered access to the body of the vehicle for loading and unloading.

It has been the practice to provide a common cover for open top vehicles which can be folded up and stowed in the vehicle when not in use, thereby taking up valuable payload space. Such covers, when in use, are stretched over the open top of the vehicle and held down, either by individual tie ropes, or by draw ropes, which, during wet weather become swollen at the tie and take considerable time to loosen. In some cases the vehicle is provided with U-shaped cover support rods which fit into sockets on the sides of the vehicle and have to be lifted up and set aside from the vehicle before the vehicle can be loaded or unloaded from above. Such U-shaped cover support rods invariably become bent out of shape and are difficult to set in place on the vehicle once they have been removed.

The present invention is for a novel cover means for open type vehicles which overcomes all of the difficulties inherent in the present types of vehicle covers and consists of a series of straight, spring type rods which, in one position, are located in vertically disposed sockets on the sides of the vehicle, the rods being all disposed on one side or the other of the vehicle whichever is most convenient for loading or unloading of the vehicle. A cover of canvas or other suitable material such as nylon and the like is provided with transverse rows of cleats or rings which are threaded over at least certain of the rods so as to extend lengthwise of the vehicle and, when the rods are standing vertically in their sockets, the cover will fold lengthwise on itself and rest on the top lengthwise edge of the adjacent side of the vehicle. The top end of each of the vertically disposed sockets is provided with a sector shaped pocket extending outwardly at right angles to the side of the vehicle. When the top of the vehicle is to be covered, such as after loading, the rods are lifted out of the vertical sockets and their lower ends are located in the sector shaped pockets. The rods are then bent across the open top of the vehicle and their free ends inserted into the sector shaped pockets on the opposite side of the vehicle. The cover, which is supported by the rods, can now be drawn over the arched rods to completely cover the open top of the vehicle. A shock cord is threaded through a series of grommets located adjacent to the edges of the cover, and a series of hooks, mounted on the shock cord between each of the ferrules, are engaged with a horizontal rod extending along the sides and ends of the vehicle. For entry into the top of the vehicle, the cover can be disengaged from the horizontal rods along one side and both ends of the vehicle, and then pushed back on its supporting rods towards the opposite of the vehicle then, if necessary, the ends of the rods opposite from the pushed back cover, can be withdrawn from their angled pocket. The rods will then straighten out and can then be allowed to drop down into the vertical sockets adjacent the pushed back cover, to allow complete access to the open top of the vehicle, for loading or unloading.

The object of the invention is to provide cover means for open type vehicles which can be retained on the vehicle at all times and which can be quickly moved to cover or expose the open top of the vehicle.

A further object of the invention is to provide a novel cover supporting means which need not be removed from the vehicle during loading or unloading.

A further object of the invention is to provide means whereby the cover is slidable transversely of the vehicle on a series of spring supporting rods.

A further object of the invention is to provide a series of straight spring rods which can be arched over the open top of a vehicle or be located vertically in sockets on one side or other of a vehicle.

A further object of the invention is to provide a cover tie means which can be manipulated rapidly to secure the cover in place over the open top of the vehicle.

These and other objects of the invention will be apparent from the following detailed specification and the accompanying drawings, in which:

FIG. 1 is a side elevation of a railway gondola car having a cover according to the present invention, with the cover partly removed to show some of the cover supporting rods.

FIG. 2 is a plan view of the arrangement shown in FIG. 1.

Figure 3:
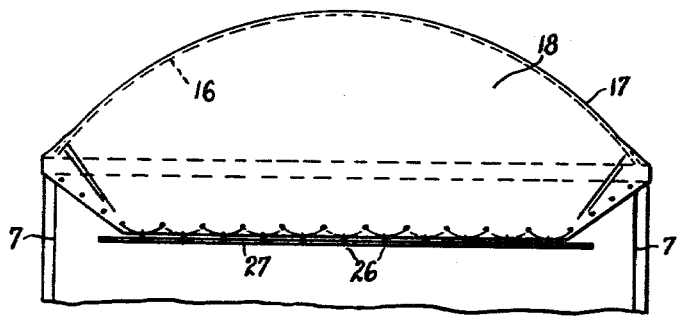
FIG. 3 is an end view of the top portion of the gondola car shown in FIG. 1 but to a larger scale and showing the end portion of the cover secured in place.

Referring to the drawings, the vehicle 5 shown here is a railway gondola car, closed on all sides and open at the top. However, it should be understood that this is for illustrative purposes only and that the invention can be applied to any open top type of vehicle such as automatic trucks, trailers, barges, etc.

The vehicle 5 is provided with a series of vertically disposed tubular sockets 6 secured to the sides 7 of the vehicle at spaced apart intervals. These tubular sockets 6 extend upwards through the bulb angle 8 and top reinforcing bar 9, and downwards to within a short distance of the vehicle side frame 10. A U-shaped bar 11 is secured to the bottom end of the socket 6 and acts as a stop, as will be explained later, and at the same time permits drainage of moisture out of the socket.

The outward facing portion of the upper end of the sockets 6 is cut away at 12, and a sector shaped pocket 13 is fitted into the cut out portion of the socket. The pocket 13 has a radiused bottom wall 14 and a U-shaped side wall 15 whose vertical edges are welded to the vertical edges of the cut out portion 12 of the socket 6.

Figure 4:
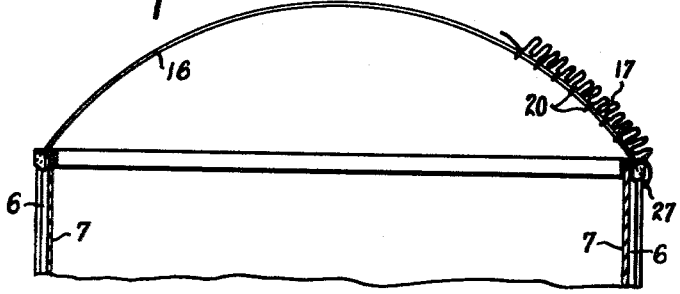
FIG. 4 is a transverse section of the car shown in FIG. 1 showing a cover support rod arched over the open top of the car, and the cover pushed over to one side.
Figure 5:
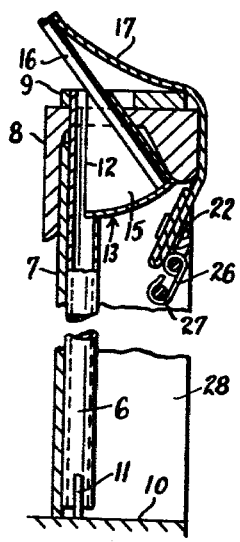
FIG. 5 is a vertical section of the side of the car, taken on the line 5—5 of FIG. 1 but to a larger scale, showing the method of supporting the end of the arched rod and the cover securing means.
Figure 6:
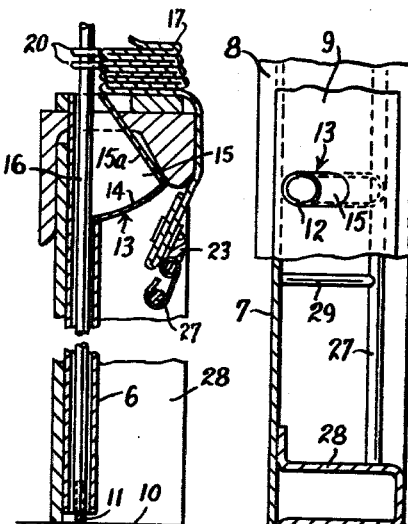
FIG. 6 is a vertical section similar to FIG. 5 without the cover and showing the straight spring rod supported in its socket on the side wall of the car.
Figure 7:
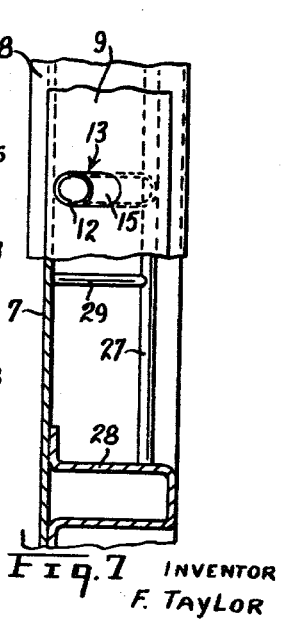
FIG. 7 is an enlarged plan view of the side of the car, partly in section to show the rod to which the cover is secured.

A series of straight cover support rods 16 of spring steel are adapted, in one position to be supported vertically in the tubular sockets 6 in the manner shown in FIG. 6 and rest on the U-shaped bar 11 at the bottom of the socket, and in the other position, have one end rest in the pockets 13 in the manner shown in FIG. 5 and be bent to arch cross the open top of the car in the manner shown in FIGS. 2, 3 and 4, and have their opposite end rest in a similar pocket 13 on the opposite side of the vehicle. The vertical depth of the U-shaped pockets 13 ensure that the rods extending across the vehicle will be maintained in a vertical plane. The outward facing portion 15a of the U-shaped wall 15 of the pocket 13 is supported and strengthened by the adjacent portion of the bulb angle 8.

Figure 8:
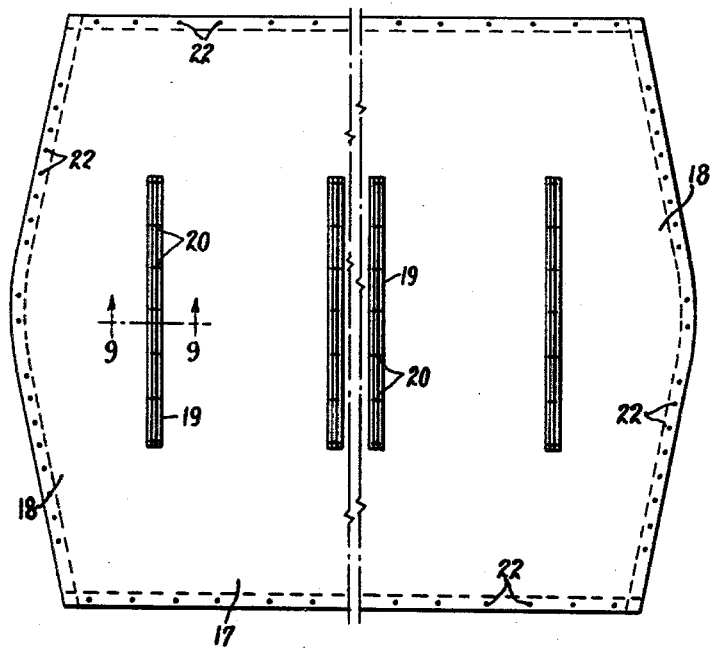
FIG. 8 is a plan view of the inner facing surface of the cover showing the means for anchoring the supporting rod engaging rings.
Figure 9:
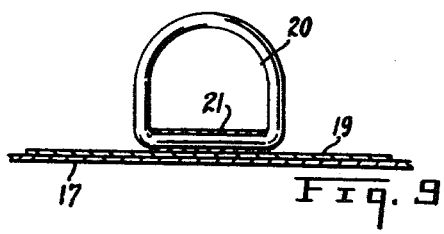
FIG. 9 is an enlarged cross section on the line 9—9 of FIG. 8 showing one of the support rod engaging rings.
Figure 10:
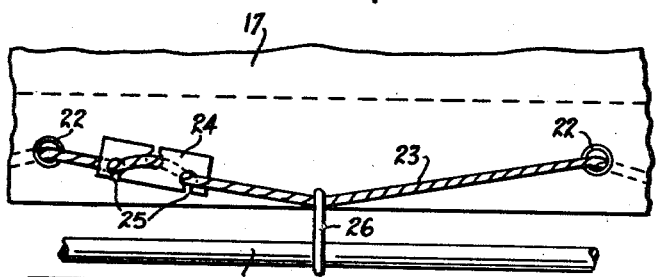
FIG. 10 is an enlarged side elevation taken from FIG. 1 showing the shock cord threaded through the eyelets in the cover and the hook for engaging the shock cord with the bar on the side of the vehicle.

The cover 17 of canvas or other suitable material such as nylon, extends the full length of the vehicle and, when in position extends down over the top edges of the sides and ends of the vehicle. The end portions 18 are shaped as shown in FIG. 8 in order to present as smooth surface as possible when stretched and held down in the manner shown in FIG. 3. A series of strips 19 of reinforcing material are laid transversely on the inner surface of the cover at spaced apart intervals lengthwise of the cover, and in line with each of the cover supporting rods 16. A series of rings 20 are secured to the reinforcing strips 19 by the clips 21. These rings 20 are threaded over the rods 16 to support the cover 17 on the rods.

The outer peripheral edges of the cover 17 are folded over on themselves and stitched in well known manner. A series of grommets 22 are spaced around the edge of the cover, and a stretchable shock cord 23 is threaded through the grommets. A cord retainer 24 having three slots 25 engages with the shock cord 23 adjacent each of the grommets 22 in order to prevent the cord from unthreading through the grommets on breakage of the cord, regardless of where a break in the cord may occur.

Hook members 26 are secured to the shock cord 23 midway between each of the grommets 22 and are adapted to engage with the horizontal rods 27 located on the sides and ends of the vehicle. These rods 27 are located between the vertical ribs 28 at a spaced distance outwardly of the walls 7 and at a predetermined distance downwards from the top edge of the vehicle. Additional supports 29 for the rods 27 may be provided as required.

In the operation of this invention, the rods 16 are always retained in the vehicle in either of the positions shown in FIGS. 5 or 6 and the cover 17 is always engaged with and is self-storing on the rods 16. When the vehicle is being loaded or unloaded and depending on the nature of the load, it is preferable that the rods 16 be in a vertical position as shown in FIG. 6 and all at one side of the vehicle so as to facilitate loading or unloading from the opposite side. In this vertical position of the rods 16, the cover 17 will fold upon itself and rest on the top edge of the side of the car along its full length.

In order to cover the vehicle, the rods 16 are lifted out of the tubular socket part 6 and the end of the rods allowed to seat in the sector shaped pockets 13, without disturbing the cover 17. The free end of the rods are then bent across the open top of the vehicle and inserted into the pocket 13 in the opposite side of the vehicle. The sector shape of the pockets 13 within which the ends of the rods 16 rest, permit the straight rods to take on an arch form without undue strain, and are readily bent to traverse the vehicle. The rods will then take up the arched position shown in FIG. 4 with the cover 17 still folded upon itself in the position shown. The cover 17 can then be drawn over the rods and hooked on to the rod 27 on the opposite side of the vehicle. The end portions 18 of the cover are then drawn down over the ends of the vehicle and hooked on to the end rods 27.

Manipulation of the cover and supporting rods take only a few minutes either to cover or uncover the vehicle, and in the uncovered position, the cover is self-storing regardless of whether the supporting rods are in the arched position spanning the vehicle or in the vertical position at one side or other of the vehicle.

When the cover is over the vehicle and secured in place it is completely taut so that rain and snow is shed without the formation of pockets of moisture. Furthermore, due to the arched support of the cover and its end fastening, the cover stands little or no chance of being displaced by high winds, and the contents of the vehicle are given maximum protection, both from the weather and from pilfering.

What I claim is:

1. A cover assembly for open top vehicles in combination, a vehicle having side and end walls and an open top, sector shaped sockets on the side walls of the said vehicle, the said sector shaped sockets being located in planes at right angles to the said side walls of the vehicle, straight spring rods having one end thereof mounted in the sockets on one side of the vehicle, the said rods adapted to be bent transversely of the vehicle and having their opposite ends secured in the sockets on the opposite side wall of the vehicle, and a cover extending lengthwise of the vehicle and slidably secured on the said rods.

2. A cover assembly as set forth in claim 1 in which the top edge of the side walls of the vehicle include a bulb angle and the said sector shaped sockets project upwards through the said bulb angle and are supported by the bulb of the said bulb angle.

3. A cover assembly for open type vehicles in combination a vehicle having side and end walls and an open top, sockets on the said side walls of the vehicle, the said sockets each including a vertically disposed tubular portion and an offset sector shaped pocket adjacent the upper end of the tubular portion and communicating therewith, the said sector shaped pockets being located in a plane at right angles to the side walls of the vehicle, straight spring rods having one end thereof mounted in the sockets on one side of the vehicle, the said rods adapted to be bent transversely of the vehicle and having their opposite ends secured in the sockets on the opposite side wall of the vehicle, and a cover extending lengthwise of the vehicle and slidably secured on the said rods.

4. A cover assembly as set forth in claim 3 in which the said tubular portion of the socket is open at its bottom end to provide a drainage opening and a stop member partially blocks the open end of the tubular member.

5. A cover assembly for open top vehicles in combination, a vehicle having side and end walls and an open top, sockets on the side walls of the vehicle, the said sockets each comprising an open ended tube located vertically on the outer facing side of the said walls of the vehicle at spaced intervals lengthwise thereof, the upper end of each of the said tubes having a portion of its wall cut out, a sector shaped pocket set in the cut out portion of the said tubes, the said pockets being located in planes at right angles to the said side walls of the vehicle, straight spring rods having one end thereof mounted in the sockets on one side of the vehicle, the said rods adapted to be bent transversely of the vehicle and having their opposite ends secured in the sockets on the opposite side of the vehicle, and a cover extending lengthwise of the vehicle and slidably secured on the said rods.

6. A cover assembly as set forth in claim 5 in which the lower end of the said pocket is radiused in the vertical plane and the upper end of the pocket is radiused to coincide with the inner diameter of the said tubular portion of the socket.

7. A cover assembly for open top vehicles in combination, a vehicle having side and end walls and an open top, sector shaped sockets in the side walls of the said vehicle, the said sector shaped sockets being located in planes at right angles to the said side walls of the vehicle, straight spring rods having one end thereof mounted in the sockets on one side of the vehicle, the said rods adapted to be bent transversely of the vehicle and having their opposite ends secured in the sockets on the opposite side wall of the vehicle, a cover extending lengthwise of the vehicle and slidably secured on the said rods, and a stretchable shock cord securing the said cover to the side and end walls of the said vehicle and holding the said cover on one side wall of the vehicle when the cover is released from the opposite side wall to uncover the vehicle.

References Cited by the Examiner

UNITED STATES PATENTS

| | | | |
|---|---|---|---|
| 2,229,935 | 1/41 | Powers | 24—129 X |
| 2,856,941 | 10/58 | O'Neal | 135—1 |
| 2,889,171 | 6/59 | Morris | 105—377 X |
| 3,092,126 | 6/63 | Smith | 135—5 |
| 3,097,880 | 7/63 | Reader | 296—104 X |

ARTHUR L. LA POINT, *Primary Examiner.*